Dec. 11, 1962     L. W. GUTH ETAL     3,067,759
DISWASHING APPARATUS
Filed Dec. 2, 1960
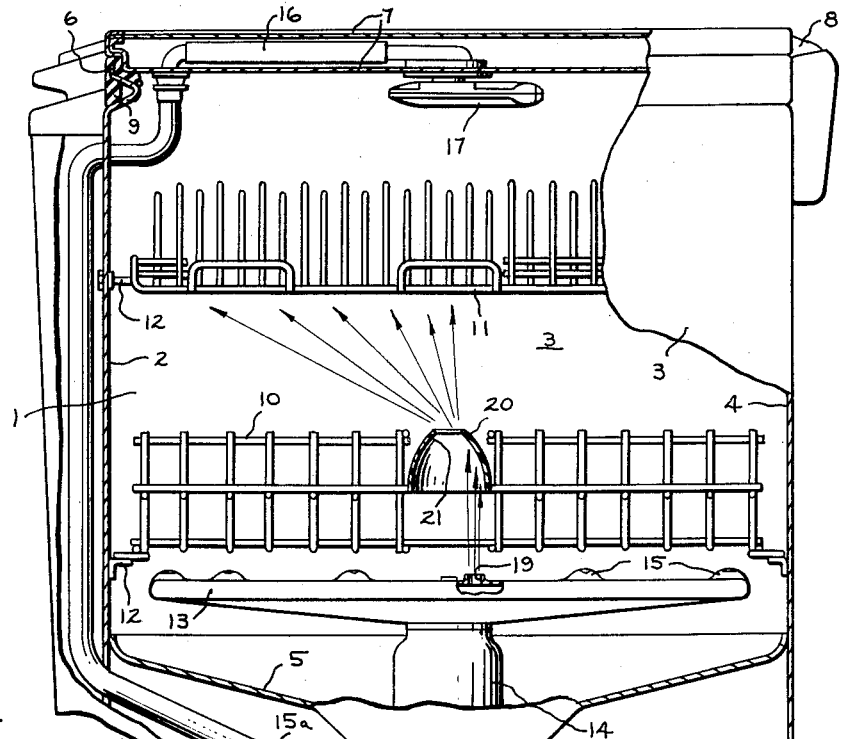
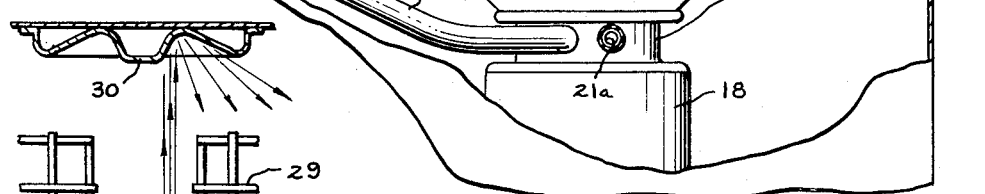
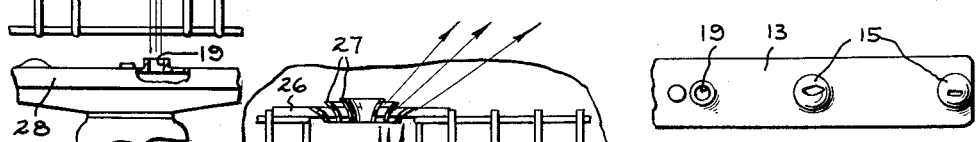
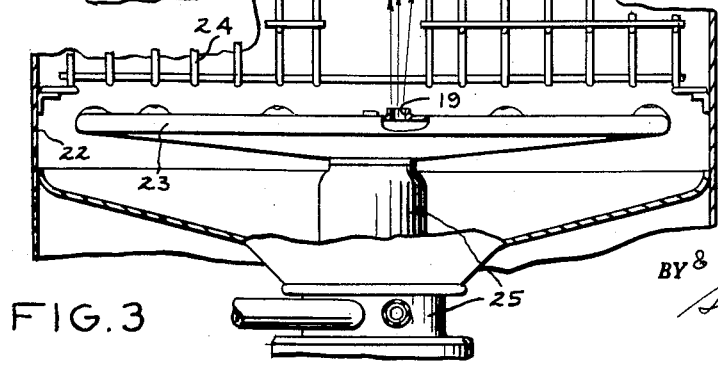
INVENTORS
LAUREN W. GUTH
BY & DONALD S. CUSHING
THEIR ATTORNEY United States Patent Office 3,067,759
Patented Dec. 11, 1962

3,067,759
DISHWASHING APPARATUS
Lauren W. Guth and Donald S. Cushing, Louisville, Ky., assignors to General Electric Company, a corporation of New York
Filed Dec. 2, 1960, Ser. No. 73,240
10 Claims. (Cl. 134—176)

This invention relates to dishwashing apparatus which is provided with a tub and openwork rack means for supporting dishes and other utensils in the tub for washing and it has for its object the provision of means for effecting an improved cleansing water action on the dishes supported within the rack means.

While it is not limited thereto, this invention is especially useful in dishwashing machines which are provided with spray means in the tub as the primary means for directing sprays of water through the openwork rack means to effect a cleansing action on the dishes supported in them and it contemplates the provision of spray means for effecting a wide and varied water distribution in spray form over substantially all areas of the openwork rack dish supporting means, thereby to effect a good cleansing action on all of the utensils placed in the tub for washing.

This invention also, while not limited thereto, has a special utility in washing machines of non-circular shape in plan view having upper and lower openwork racks in the washing tub under which water circulating or spray means are provided to spray water upwardly through the racks, all as found in many commercially available machines. The lower rack generally is arranged to support flat plates and the like in position to be washed and at the same time function to deflect water to the upper rack so that the dishes and utensils supported therein may be cleansed. However, many times people will place relatively deep dishes, such as soup bowls, cereal plates and the like, in the lower rack where the flat plates should be placed. These articles interfere with and at times intercept the movement of the sprays into the upper rack with the result that the articles therein may not be properly cleaned; and this invention in one of its aspects contemplates spray means for insuring that the utensils in the upper tray will be cleaned regardless of how the lower rack is loaded.

Briefly stated, in accordance with the broader aspects of this invention, we provide means in the vat for creating a jet of water and rotate this jet in an orbit around a predetermined axis. The jet is directed toward the rack means, and positioned to engage the jet as it is rotated are baffle means arranged to form from the jet a spray of water which is directed to the rack means and which spray is progressively moved over the rack means as the jet is rotated.

The foregoing arrangement may be used as a primary spray distribution means. But also it may be used as a supplementary spray distribution means used in conjunction with a primary water distributor as for example a reaction spray device. In this case conveniently and economically the movable jet may be formed from a nozzle opening formed as a part of the primary reaction spray device.

Our invention will be better understood from the following description taken in connection with the accompanying drawing and its scope will be pointed out in the appended claims.

In the drawing:

FIG. 1 is a fragmentary side elevation of dishwashing apparatus embodying this invention, parts being broken away and parts shown in section so as to illustrate certain details of construction;

FIG. 2 is a fragmentary plan view of an element used in the apparatus of FIG. 1;

FIG. 3 is a fragmentary vertical sectional view taken through apparatus embodying a modified form of this invention; and FIG. 4 is a fragmentary view illustrating still another form of this invention.

Referring to the drawing, the invention has been shown in FIGS. 1 and 2 as applied to dishwashing apparatus comprising a tub 1 of generally box-like form, being substantially square in horizontal cross-section; the tub is defined by a front wall 2, a pair of side walls 3, a rear wall 4, and a depressed bottom wall 5 forming a sump—all joined together in any suitable way to define the tub which is provided with a top opening 6. This opening is closed by a cover 7 hinged to the rear wall by hinge means 8, and when closed resting on sealing gasket means 9 mounted on the upper edges of the front, side, and rear walls of the tub. The front, side and rear walls extend below the bottom wall 5 and thereby constitute a base for the machine.

Mounted within the tub 1 are lower and upper openwork racks 10 and 11 for supporting the dishes and other utensils to be cleansed. These racks may be of any suitable openwork construction which will support the dishes and utensils and which will permit water spray to pass freely through then and onto the articles supported in them. They are, however, generally of square box-like form to conform to the horizontal cross-section of the tub 1, and they are supported in vertically spaced relation by any suitable means such as brackets 12 fixed to the walls of the tub.

Positioned below the lower rack 10 above the sump-like bottom wall 5 is a water distributor 13 for forcing streams of water in spray form upwardly through the openwork racks 10 and 11. This distributor is in the form of an elongated reaction spray device consisting of a pipe extending transversely across the tub in a horizontal position, as shown. The distributor is mounted in any suitable manner to revolve at its center, which is coincident with the central vertical axis of the tub. However, the distributor preferably will be rotatably mounted on suitable pump means 14 which in addition to its function of rotatably supporting the distributor also will function to supply water under pressure to the interior of the distributor at its central area. At its upper side the pipe 13 is provided with a series of oblique ports 15 arranged in such a manner that when water under pressure is ejected from them, the water will cause the pipe to rotate by its reaction on the pipe in a well known manner, for example, in a counterclockwise direction looking at the pipe from above. The water issuing from the revolving pipe through the multiple openings 15 is hurled upwardly and outwardly in spray form through the racks 10 and 11 to effect cleansing action on the utensils supported in them.

As pointed out above, water is forced under pressure through the reaction spray device 13 by the suitable pump means 14, the details of which form no part of this invention and therefore have not been shown in detail; suffice it to say the intake of the pump means will be connected with the sump 5 and its outlet means with the distributor 13 so that when the pump is operated water which will have been supplied to the tub 1 and collected down in the sump 5 will be drawn into the pump means and then forced into the spray device 13 from which it will issue in spray form as described.

The pump means 14 if desired may also force water from the sump 5 through pipe means 15a and 16 to a top spray device 17 for spraying water into the top part of the tub onto and through the top rack 11. Preferably and as shown this top spray device means 17 will be that described and claimed in the co-pending patent of Russell M. Sasnett, No. 2,987,260, filed November 18, 1959 and assigned to General Electric Company, the assignee of the present application. The pump means 14 is driven by a suitable electric motor 18.

In accordance with this invention we provide means for effecting the supply of additional spray to the underside of the upper rack 11. This means comprises means for supplying to the vat an upwardly directed jet of water, revolving the jet in orbit around an axis while maintaining its upward direction, and interposing in its path water diffusion and deflecting means for establishing a spray pattern which is directed into the upper rack and revolved to cover all areas of the rack as the jet rotates. In the form of the invention shown this means includes a nozzle orifice or opening 19 formed on the distributor 13 directed upwardly and formed to issue or eject a jet of water from the distributor as a high velocity substantially solid stream. This nozzle 19 is off-set from the central axis of rotation of the distributor so that as the distributor rotates the jet of water is rotated about this axis eccentrically or in orbit, and in the form of the invention shown, in substantially parallel relation with this axis, although this is not necessary. Preferably, however, the nozzle 19 will be located in the general central area of the distributor so that the jet of water will pass up into the generally central area of the tub and hence of the lower rack 10.

Supported in this central area of the rack 10 and preferably on the rack is a water interceptor and diffusion baffle means 20. This means 20 may have a formation which will depend upon the general spray pattern desired. In FIG. 1, the baffle, as shown, is of generally tubular acorn-shape form, open at the bottom and top, and its interior having a surface 21 formed as a surface of revolution generated by rotating an arc-shaped line of the shape shown about the central vertical axis of the tub and of the axis of rotation of the distributor 13. This surface 21 is positioned by the baffle means so that it intercepts the jet projected up into the baffle by nozzle 19 continuously as the jet rotates about the axis of rotation, as shown in FIG. 1. The surface is so shaped that the jet of water is broken up and diffused into a roughly fan-shaped spray directed upwardly and outwardly toward the bottom of the rack 11; as shown the wide upper end of the fan spray extends roughly from the center of the tray 11 to its outer edge. As the distributor 13 rotates, the spray pattern, of course, rotates so as to cover successively all areas of the bottom of the rack 11 and hence cover the bottom surfaces of all the articles supported in the rack. This spray means insures that the bottom surfaces of all these articles are subjected to a high velocity spray.

In the operation of the machine, the dishes and other articles to be cleansed will be loaded onto the racks 10 and 11, and a suitable quantity of water will be supplied to the tub by any suitable supply means. When the motor is energized it will force water to the distributor 13 from the sump 5 to spray water, as explained, up through the racks 10 and 11; at the same time water will spray from the device 17 onto the upper side of upper rack 11. Also the nozzle 19 will continuously form the jet which rotates to engage continuously the surface 21 which as explained will deflect the jet and diffuse it so as to form a rotating spray projected upwardly against the bottom of rack 11. Any suitable means may be used to empty the tub at the conclusion of the washing operation. This means may include a drain line 21a connected with the pump and which will drain only in response, for example, to a reversal of the motor 18 to drive the pump means 14 in the reverse direction.

In the form of the invention shown in FIG. 3 the tub 22, water distributor 23, the two lower and upper racks (the lower one 24 only being shown) and the water supply pump means 25, all will be arranged as are the corresponding parts of FIGS. 1 and 2. Here, however, the baffle means 26 is in the form of a series of nested and spaced apart ring-shaped baffle members 27 (three shown) located with their central axes coincident with each other and with the central vertical axis of the tub. Each ring is generated by rotating an arc-shaped line of the respective general shapes shown about the central axis; the result is that each arc-shaped ring is somewhat flatter in any vertical cross-sectional line than its next adjacent inner ring. And the rings increase in height progressively from the outer one to the next inner one. Here the outer surfaces of the baffle means are in the path of the moving jet of water, as shown, and intercept it and generate the generally fan-shaped spray.

In each form of the invention illustrated it will be observed that the baffle means—20 in FIG. 1 and 26 in FIG. 3—occupies but a small part of the central area of the rack with which it is associated, the remainder of the rack being available for its useful function of holding dishes and utensils for cleaning. Also it will be observed that these baffle means are located relatively high with regard to the general dish and utensil areas of these racks so as to form the fan-shaped sprays above the racks.

It will be understood that this invention may be used to spray water into the top of the upper rack instead of using the device 17. Thus, as shown in FIG. 4, the eccentric or offset jet of water may be generated by a distributor 28 similar to 13 and 23 which may be located below the upper rack 29, for example between this rack and the lower rack (not shown in FIG. 4). The jet will pass up in a substantially vertical direction through the upper rack and caused to engage a suitable surface of revolution 30 described about the central axis of the tub and located below the bottom of the top wall of the tub above the upper rack and arranged to form a spray directed downwardly onto the top of the rack; which spray, as described in connection with FIGS. 1 and 3, will be rotated as the jet is rotated.

Other modifications of this invention will occur to those skilled in this art and it is to be understood, therefore, that this invention is not limited to the particular embodiments disclosed but that it is intended to cover all modifications which are within the true spirit and scope of this invention as claimed.

What we claim as new and desire to secure by Letters Patent of the United States is:

1. Dishwashing apparatus comprising a tub of non-circular shape in plan view, an openwork dish supporting rack in said tub, nozzle means in said tub offset slightly from the central vertical axis of the tub and arranged below said rack for projecting a supply of water in the form of a jet upwardly in said tub in a predetermined direction with respect to the horizontal, means for rotating said nozzle in orbit about said vertical axis of said tub while maintaining said jet in said predetermined direction, and stationary baffle means symmetrically arranged on the said vertical axis of the tub and above said nozzle to intercept said jet substantially throughout its movement by said nozzle to disperse the jet outwardly in spray form over successive areas of said rack as said nozzle rotates.

2. Dishwashing apparatus comprising a tub of non-circular shape in plan view, an openwork rack, means supporting said rack in a stationary position in the upper portion of said tube substantially to cover the horizontal area of said tub at said upper portion, a reaction spray device revolvably mounted in the lower part of said tub below said rack to rotate on a predetermined axis, said spray device having a discharge port eccentrically located a slight amount with respect to said axis and directed upwardly to direct a solid jet of water supplied to said device upwardly in said tub in a direction substantially parallel to said axis and to rotate said jet about said axis when said spray device rotates, and stationary baffle means centrally located in said tub about said axis and below said rack in the path of movement of said jet as it moves about said axis to intercept it and disperse it in a spray pattern upwardly in said rack, said spray pattern moving to cover successive areas of said rack when said spray device rotates.

3. Dishwashing apparatus comprising a tub of non-circular shape in plan view, stationary upper and lower substantially horizontally positioned openwork dish supporting racks in said tub, an elongated reaction spray device in said tub below said lower rack rotatable substantially in the central vertical axis of said tub and provided with discharge ports for water supplied to the device for effecting rotation of said device to distribute water in spray form upwardly and outwardly in said tub below said lower rack, and said spray device also having a top opening discharge port offset slightly from said axis to project a jet of water upwardly in said vat and movable in an orbit about said axis as said spray device rotates, and surface means symmetrically disposed about the central vertical axis and in the path of movement of said jet thereby functioning continuously to deflect said jet in spray form to cover successive areas of said upper rack.

4. The dishwashing apparatus specified in claim 1 wherein said stationary baffle means comprises a continuous surface of revolution generated with said axis as a center and positioned to engage said jet continuously as it rotates so as to redirect and disperse said jet in spray form onto said rack.

5. The dishwashing apparatus specified in claim 1 wherein said stationary baffle means comprises a single surface of revolution generated with said axis as a center and defining a tubular member open at the top and bottom with the surface tapering inwardly from the bottom to the top and positioned so that said jet as it rotates continuously enters said lower end to engage said surface for dispersal in spray form through the upper end onto said rack.

6. The dishwashing apparatus specified in claim 1 wherein said stationary baffle means comprises a series of nested and spaced apart surfaces of revolution generated with said axis as a center, said surfaces curved to engage and disperse said jet in spray form onto said rack continuously as said jet rotates.

7. The dishwashing apparatus defined in claim 1 wherein said nozzle means is formed to project said jet in a substantially vertical direction, and said stationary baffle means is formed as a vane rigidly secured above said rack to disperse water downwardly as well as outwardly.

8. The apparatus defined in claim 7 wherein an additional rack is provided within said tub in vertically spaced relation to the first mentioned rack, said vane being secured above both said racks.

9. The apparatus defined in claim 7 wherein said vane comprises a continuous surface of revolution generated with said axis as a center.

10. The apparatus defined in claim 7 wherein said vane comprises a curved surface of revolution concave with respect to said jet generated with said axis as a center.

References Cited in the file of this patent
UNITED STATES PATENTS

| | | |
|---|---|---|
| 1,464,436 | Mann | Aug. 7, 1923 |
| 1,511,661 | Dantzebecher | Oct. 14, 1924 |
| 1,655,280 | Merseles et al. | Jan. 3, 1928 |
| 1,916,806 | Myrick | July 4, 1933 |
| 2,194,342 | Walker | Mar. 19, 1940 |
| 2,236,791 | Forsberg | Apr. 1, 1941 |
| 2,468,584 | Wotring | Apr. 26, 1949 |
| 2,586,398 | Vars | Feb. 19, 1952 |
| 2,608,983 | Idle | Sept. 2, 1952 |
| 2,654,377 | Sway | Oct. 6, 1953 |
| 2,664,903 | Sway | Jan. 5, 1954 |
| 2,701,574 | Hollerith | Feb. 8, 1955 |